(No Model.) 4 Sheets—Sheet 1.
F. W. HILLARD.
TYPE WRITING MACHINE.
No. 580,281. Patented Apr. 6, 1897.
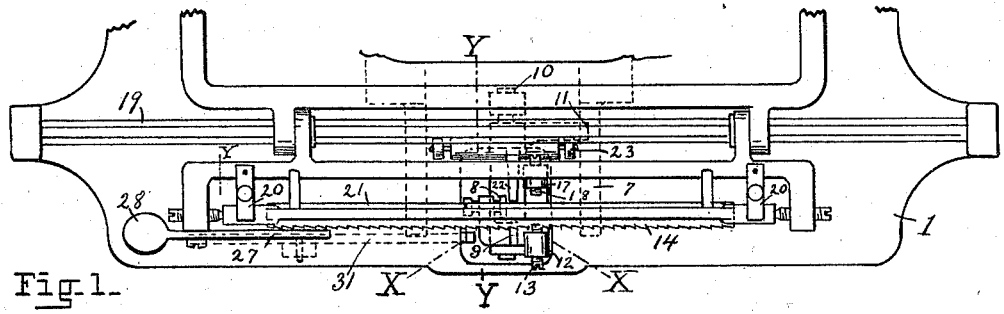
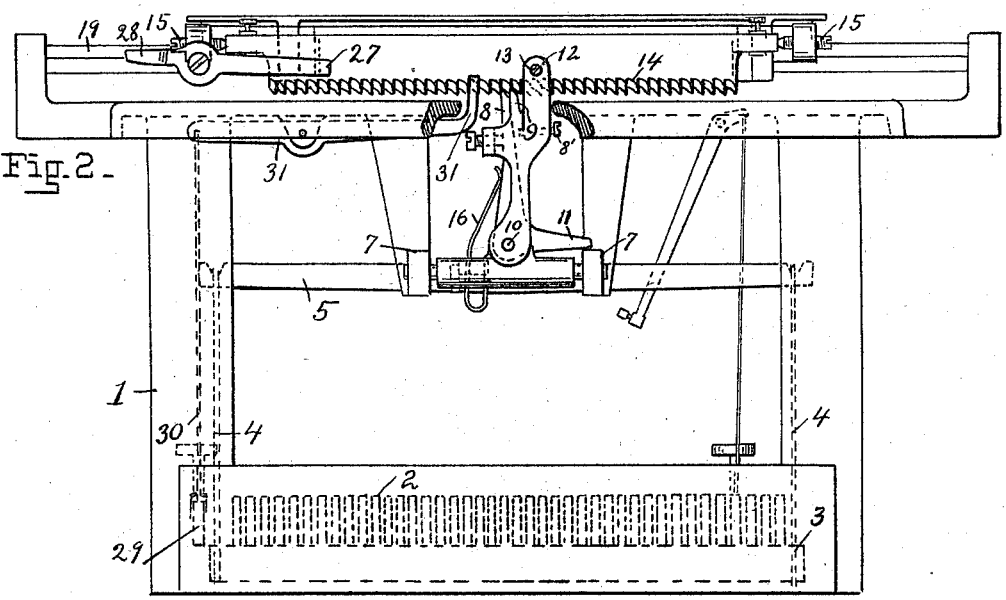
Witnesses:
Samuel W. Balch.
Paul Gorham.
Inventor,
Frederic W. Hillard,
by Thomas Ewing Jr
Attorney.

(No Model.)  4 Sheets—Sheet 2.
F. W. HILLARD.
TYPE WRITING MACHINE.
No. 580,281.  Patented Apr. 6, 1897.
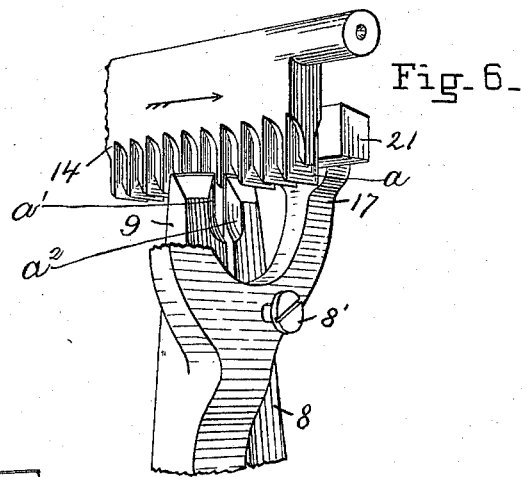
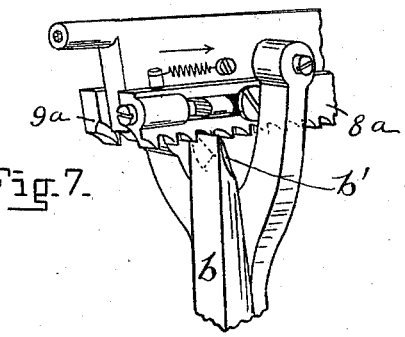
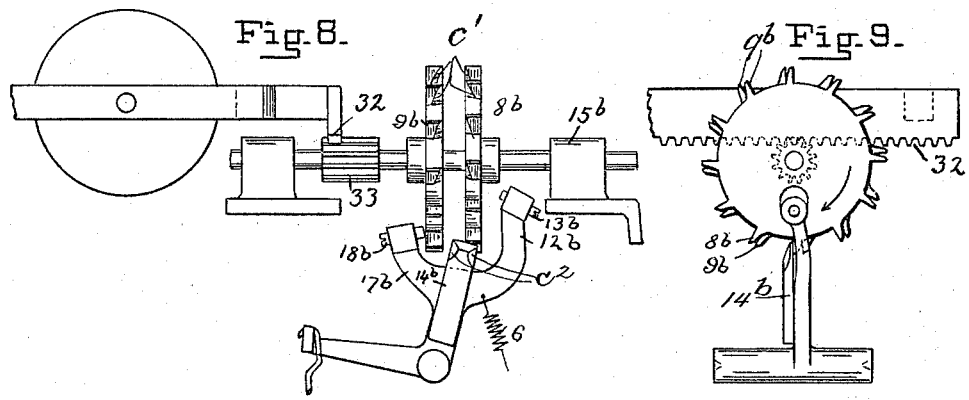
Witnesses:
Samuel W. Balch
Paul Gorham
Inventor,
Frederic W. Hillard,
by Thomas Ewing Jr.
Attorney.

(No Model.)  4 Sheets—Sheet 3.
F. W. HILLARD.
TYPE WRITING MACHINE.
No. 580,281.  Patented Apr. 6, 1897.
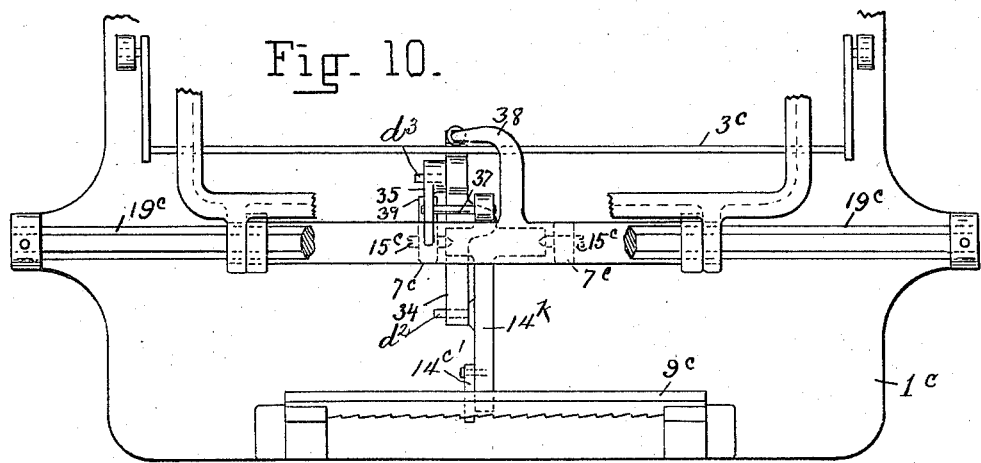
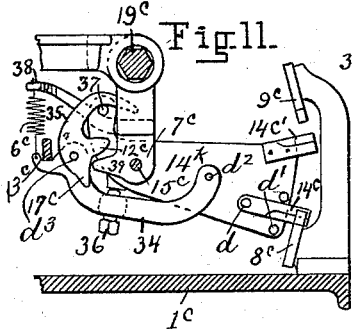 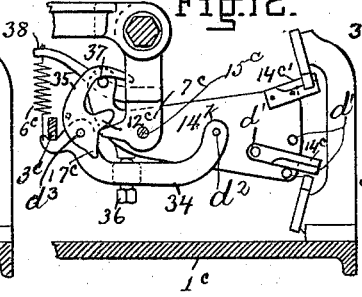 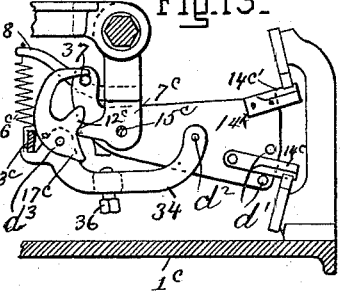
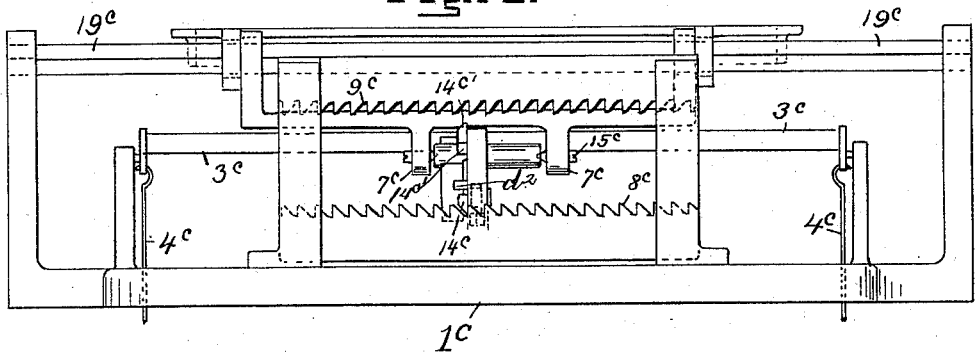
Witnesses:
Samuel W. Balch
Paul Gorham
Inventor,
Frederic W. Hillard
by Thomas Ewing Jr.
Attorney.

(No Model.) 4 Sheets—Sheet 4.
F. W. HILLARD.
TYPE WRITING MACHINE.
No. 580,281. Patented Apr. 6, 1897.
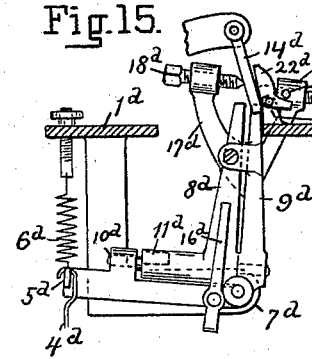
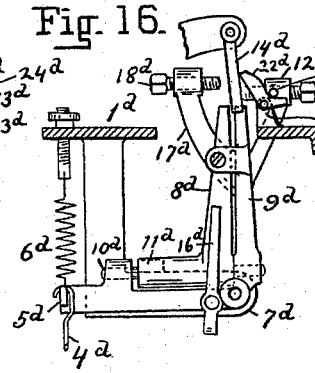
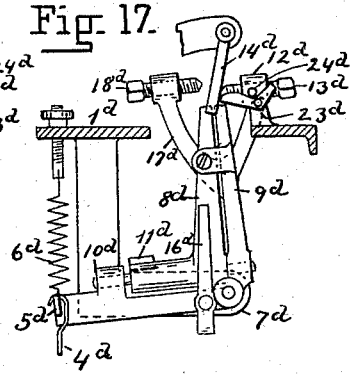
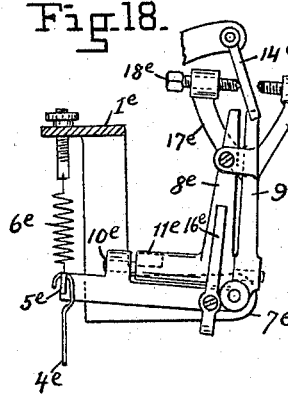
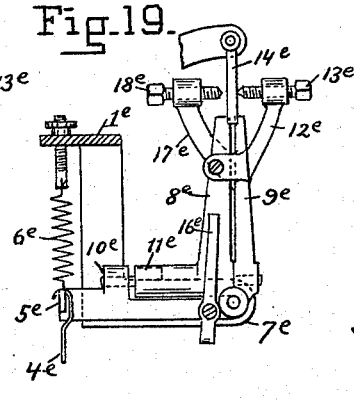
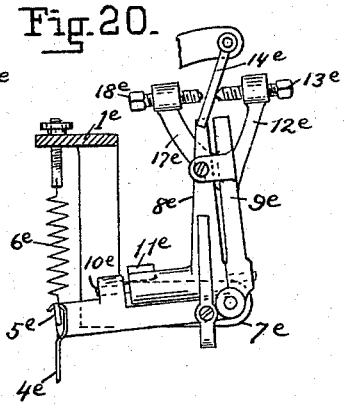
Witnesses:
Samuel W. Balch
Paul Gorham
Inventor,
Frederic W. Hillard.
By Thomas Ewing, Jr.
Attorney.

United States Patent Office.

FREDERIC W. HILLARD, OF TOTTENVILLE, NEW YORK.

TYPE-WRITING MACHINE.

SPECIFICATION forming part of Letters Patent No. 580,281, dated April 6, 1897.

Application filed January 9, 1893. Serial No. 457,800. (No model.)

*To all whom it may concern:*

Be it known that I, FREDERIC W. HILLARD, a citizen of the United States of America, residing at Tottenville, Richmond county, State of New York, have invented certain new and useful Improvements in Type-Writer Escapements, of which the following is a specification.

My invention is an improvement in type-writer escapements, its aims being to attain a uniform and certain feed at high speed by controlling the moment of release of the paper-platen, to avoid the blurring incident to movement of the paper at the instant of printing, whether in feeding or by reason of irregular action of the machine, and to secure an escapement which by its action polishes its contacting surfaces.

An important feature of my invention consists in an escapement comprising two engaging members, which are disengaged and reengaged to effect the spacing, in which the spaced member—that is, the member of the escapement which moves forward step by step with the paper-platen as the paper is fed—is also movable transversely with respect to the other member of the escapement to effect the step-by-step movement in the spacing. Both members may be movable transversely with respect to each other, as in the forms shown in Figures 1 to 9 and 15 to 20, inclusive, of the accompanying drawings, or the spaced member may be alone transversely movable, the other member being stationary, as in the form shown in Figs. 10 to 14, inclusive.

My invention also comprises, broadly, means for bringing the carriage-propelling power into action with the key while the key is depressed and for thereby employing the force of the propelling power to aid in lifting the key and in reëngaging the disengaged members in the escapement and in restoring the printing member to normal position synchronously and in unison with the feed of the paper-carriage.

In its narrower aspect my invention consists in the various specific forms of escapement hereinafter described and claimed.

In the accompanying drawings, which form a part of this specification, the general form of machine shown is the Remington type-writer, though my invention is shown as applied to several forms of feeding and escapement mechanism not used on the Remington machines.

Figs. 1 to 6, inclusive, are different views of the same machine. Fig. 1 is a top view of the back of the machine, showing the escapement. Fig. 2 is a back view of the same parts in the positions of Fig. 1, the frame being broken away on the line X X of Fig. 1. Figs. 3, 4, and 5 are positional detailed views of the parts as seen from the left of Figs. 1 and 2, Fig. 3 showing these parts in their normal position of rest, Fig. 4 in an intermediate position, and Fig. 5 in the position assumed on complete depression of the key. The frame of the machine is shown in these figures in section along the line Y Y of Fig. 1. Fig. 6 is an enlarged perspective detail view of the rack and dogs as seen from the right of Figs. 1 and 2. Fig. 7 is an enlarged detail of a modification in which there is a double-rack escapement, as on the Caligraph type-writer. Figs. 8 and 9 are respectively end and back views of a modification in which the rack member of the escapement is a pair of toothed wheels. Figs. 10 to 14, inclusive, are different views of another modification. Fig. 10 is a top view of the back of the machine, several of the parts being broken away. Figs. 11, 12, and 13 are positional detail views similar to Figs. 3, 4, and 5 of the parts seen from the left of Fig. 10. Fig. 14 is a view of the top part of the back of the machine seen from the rear. Figs. 15 to 17, inclusive, are similar positional detail views of another modification. Figs. 18 to 20, inclusive, are similar positional detail views of still another modification.

In the form shown in Figs. 1 to 6 the dog member of the escapement has two elements herein called, respectively, the "spacing-dog" and the "detaining-dog," the former of which reciprocates in the line of the feeding of the carriage through the distance of one step and the latter of which cannot be moved in the line of the feeding. The rack member is attached to the paper-carriage and is normally in engagement with the spacing-dog. When the key is depressed, the spacing-dog passes out of the mesh with the rack and is moved back one space by means hereinafter described and the detaining-dog comes into mesh with the rack. During this time the carriage remains stationary. The rack is suspended so that it can be swung on pivots abutting against its ends and near its upper edge, and on the rocker-frame is an arm carrying a screw which, when the rocker-frame has swung far enough inward to free the spacing-dog from the rack and engage the detaining-dog therewith, strikes the rack at a point intermediate between the line of its pivots and the line of its teeth and pushes it over onto the spacing-dog. The carriage is then ready to be released and spaced forward upon the release of the key, as is hereinafter fully described, and when the key is released the rack and dog return to their normal position along with the rocker-frame. The transverse movement of the rack swinging on its pivots permits the let-off of the carriage to be adjusted to occur either before or at or after the instant of printing, at the preference of the operator. It also permits of the engagement of the rack with the spacing-dog while that dog is cammed backward, as is hereinafter fully described.

The parts shown in Figs. 1 to 6 are as follows: To the frame 1 are attached key-levers 2, which operate the rocker-frame through a universal bar 3 by links 4, which connect the universal bar to the horizontal bar 5, attached to the rocker-frame. The rocker-frame is swung in toward the machine on depression of a key and is returned to its original position when the key is released by a spring 6, attached to the frame. All of these parts operate in the usual manner and may be of the usual form.

The rocker-frame is mounted on supports 7 7 and carries the spacing-dog 8 and the detaining-dog 9. In so far as the swinging-rack feature of my invention is concerned the spacing-dog may be operated by the ordinary spacing-spring in the usual manner, which spaces it backward into position to engage with the succeeding tooth when released from the rack; but I prefer a different form, which does not necessarily employ the ordinary spacing-spring to space the dog backward, but which spaces the dog into position for engagement with a succeeding rack-tooth by the force of the blow on the type-key. This novel form is shown in the drawings and is as follows:

The spacing-dog is mounted so as to turn upon a pivot 10, and from it extends a longitudinal arm 11, which, in the position shown in Figs. 1, 2, 4, and 5, is in contact with one of the supports of the axis of the rocker-frame. The spacing-dog is pivoted to the rocker-frame immediately above and at right angles to the axis thereof. The longitudinal arm 11 is attached to the dog at one end near the inner end of the pivot 10 and its opposite end rests normally upon the top of the support 7 at the right-hand side of the drawings, Fig. 2. When a key is depressed, the rocker-frame is rocked inwardly and the inner end of the pivot 10 is lowered, and consequently the end of the longitudinal arm 11, which is attached to the dog 8, is lowered with the pivot 10; but as the opposite end of the arm 11 rests on the support 7 it remains stationary while the end attached to the dog is being lowered. Hence the dog 8 is caused to revolve on its pivot 10 and is cammed backward by the longitudinal arm 11 pressing on the support 7, so that the dog is moved into position to engage with the next succeeding tooth of the rack. As the rocker-frame swings inward a vertical arm 12 thereon (by a screw 13 in its upper end) engages with the rack 14. The rack is supported on two pivots 15, which abut against its ends and on which it is free to swing. After the detaining-dog is moved into engagement with the rack the rack is pushed by the screw 13 off of the detaining-dog and onto the spacing-dog. This occurs just before the key reaches its lowest point. The carriage is then free to feed forward until the face of the rack-tooth comes into engagement with the face of the spacing-dog. Then in case the key is still further depressed the parts will assume the positions of Fig. 5, with the spacing-dog back against the stop-screw, the carriage having been returned to the position from which it has started to feed, as is hereinafter explained.

If the carriage is spaced forward by the means of a mainspring, the force of this spring is thrown onto the spacing-dog as soon as the rack is pushed onto this dog and tends to move the dog forward with the rack and carriage. In the form shown in Figs. 1 to 6, as the spacing-dog is moved forward the rocker-frame will be swung outwardly, for the dog is rotated on its axis as it moves forward, and hence the longitudinal arm 11 is rocked downwardly and, pressing on the support 7, rotates the entire rocker-frame outwardly on its axis. The universal bar will thus be lifted, carrying with it the key and drawing down the type-bar, which is attached to the key-lever by its connecting-wire. This movement cannot be effected if the key is held down, but the effect of the mainspring will be to give an upward impulse to the key, which will cause the operator to remove his finger. This I call a "repulser effect."

I have shown and described what I designate as a "repulser" and have claimed it broadly in my Patent No. 577,982, dated March 2, 1897. The repulser effect will be felt by the operator at a moment not later than the instant of actual printing if the position of screw 13 is adjusted to throw the rack onto the spacing-dog at or before the instant of printing. The advantage of so timing the impulse is that the operator will never hold a key down after the type has struck the paper once, and the type therefore will not rebound and print supernumerary impressions or "ghosts." This impulse on the key and type-bar is referred to in the claims, where it is specified that one or both of them are started toward normal position.

I intend the term "printing member" as used in the claims to include not the type-bar alone, but printing devices generally— e. g., the type-wheel and hammer.

The adjustment of the escapement parts is preferably such that the carriage is fed forward prior to the printing through a portion of its letter-space feed, say, for instance, one-fifth, and then retracted again through a fraction of that distance, say, for instance, one-tenth of the letter-space. Therefore the carriage will be fed forward prior to the printing and then retracted again, but only part way back to the point from which it had started. If, however, a quick or staccato blow be struck, the type will be driven to the paper so rapidly that the carriage will have time to space forward through only a part of the distance which it would traverse if a slow or legato blow were struck. Hence with a staccato blow the carriage will be fed forward prior to the printing, but not retracted to any appreciable extent. My escapement is designed for use with the staccato blow, and it is not the intention to have the carriage retracted by the stroke on the keys. My intention is to feed the carriage forward as far as possible consistent with clear printing and not to retract the carriage at all. The means for retracting the carriage are only brought into play when an improper, slow, or legato blow is struck. In my above-mentioned patent, No. 577,982, I have stated that the function of my repulser is to notify the operator when the key has been depressed sufficiently for printing and to assist him in lifting his finger in time to avoid blurring and double impressions in the print. In the constructions which I show in this application, excepting Figs. 10 to 14, the mainspring performs the functions mentioned by drawing the carriage forward after its disengagement from the detaining-dog during the stroke on the key and before the rack comes into collision with the spacing-dog, and then it acts as a repulser by imparting an impulse through the spacing-dog to the key, by which the operator is notified that the key has been depressed sufficiently for printing and by which he is assisted in lifting his finger in time to avoid blurring and double impressions in the print.

During the depression of the key the spacing-dog 8, which normally engages with the rack 14, is disengaged from the rack and the detaining-dog 9 engaged therewith, and the spacing-dog 8 is cammed backward, as above described, by the longitudinal arm 11 pressing on the support 7. As the key is still further depressed the screw 13 engages with the rack 14 and swings the rack off from the detaining-dog 9 and into the path of the spacing-dog 8. The carriage will then be fed forward by the mainspring until the face of the rack-tooth comes into engagement with the spacing-dog. The forward feed of the carriage will then be checked so long as the key is held down, but the pull of the mainspring still tends to feed the carriage forward; but the mainspring can then only feed the carriage forward by lifting the longitudinal arm 11 on the dog 8 and by thereby returning the rocker-frame to normal position and lifting the key. Hence the mainspring tends to repulse the key and notify the operator as soon as the rack comes into collision with the spacing-dog 8; but in addition to this novel repulser function which is performed by the mainspring I have also provided means for retracting the carriage and for holding it stationary while the key is depressed and the type held against the paper, so that if the operator fails to heed the signal and does not lift his finger soon enough to avoid blurring in the print, but, on the contrary, continues to depress the key, he will simply retract the carriage in case a legato blow has been struck and the carriage spaced too far forward, and he will then hold the carriage stationary so long as the type-key is depressed and held against the paper. On the other hand, if a staccato blow is struck the carriage will, as above stated, be fed forward during the stroke through only a portion of the distance which it would traverse if a legato blow were struck. Hence in this case if the operator fails to heed the repulser-signal and does not lift his finger in time to avoid the blurring in the print the carriage will simply be stopped in its advanced position and held stationary until the key is released.

The retraction of the carriage by the blow on the key is caused by the pressure of the longitudinal arm 11 on the support 7. After the key has been depressed sufficiently to disengage the rack from the detaining-dog 9 the carriage is, as above described, brought into collision with the spacing-dog 8 by the pull of the mainspring. While the parts are in this position, if the key be still further depressed the dog 8 will be cammed still further backward by the pressure of the longitudinal arm 11 on the support 7, carrying with it the rack and retracting the carriage.

The rack and paper-carriage travel on guides 19 in the usual manner. The rack preferably has teeth with beveled edges, and the adjacent edges of the dogs are also preferably beveled, all as shown clearly in Fig. 6. The arrow in Fig. 6 shows the direction in which the rack is advanced in spacing. Looking in the opposite direction along the rack the front face $a$—i. e., the face of each tooth toward the observer—is a plane surface. From its two edges the opposite faces recede inward, so that there is a thin edge presented to each of the dogs. The edges of the dogs are also beveled, but oppositely, so that their beveled faces $a'$ $a^2$ are parallel to the beveled faces of the teeth. Thus a thin edge of each dog is presented to a thin edge of the tooth, and the dogs readily enter the rack between the teeth and slide readily upon the inclined faces of the teeth. The teeth are also beveled from their lower edges upward. Of course the bevel can be seen on but one side of the teeth in Fig. 6, but it is the same on both sides of the teeth. A spacing-spring 16 may be used to push the dog 8 to the left when out of engagement with the rack.

The force operating to draw the rack in with the dog when the rocker-frame is swung inward by reason of the friction between the surfaces of the tooth and dog is opposed and overcome either by the greater friction at the pivots 15, which support the rack, or by friction-springs 20, adjusted by screw $f$, as shown, or by a lock, which is shown in detail in Figs. 3, 4, and 5, and is constructed as follows: On the inner side of the rack is a ledge 21, against which abuts the end of an arm 22, which is free to turn on pivot 23. It is one of the three arms of a pivoted lock, a second of which arms 24 is in position to engage with the arm 17 of the rocker-frame when the rocker-frame has swung inward to the position shown in Fig. 4. The third arm 25 is pressed down by a spring 26, which returns the lock to its normal position when it is released by the rocker-frame. The adjustment of the parts must be such that the lock is depressed below the ledge on the inner side of the rack before the screw 13 begins to push the rack inward.

The lock and friction-springs will ordinarily be used together, for the friction-springs are desirable to hold the rack in engagement with the spacing-dog while the two are being returned together to normal position.

In Figs. 1 and 2 I have shown a line-lock. An arm 27, pivoted to the carriage-frame, overlaps the rack several teeth. The end of this arm is advanced by the carriage as it is spaced until it is introduced between the pushing-arm 12 of the rocker-frame and the rack. While it occupies this position the rocker-frame cannot be moved, the escapement cannot be let off, and the keys cannot be depressed. It may be tilted out of the way by depressing the handle 28 on its other end, but I show also an additional key 29, connected by a link 30 with a lever 31, pivoted to the frame of the machine and having its end projecting up just to the left of the rocker-frame. When the arm 27 is in position to stop the rocker-frame, its interfering end is immediately over the upwardly-extending end of the pivoted lever. On depression of the key 29 the pivoted lever 31 is actuated and the arm 27 is lifted out of the path of the rocker-frame. The type-keys can then be depressed and the carriage can then be spaced forward until the end of the rack is reached, the key 29 being meanwhile held down.

In Fig. 7 is shown in detail the Caligraph double-rack escapement, in which a single dog $b$ oscillates between two racks $8^a$ $9^a$, one of which, $8^a$, is a spacing-rack. The double rack is pivoted and is swung in and out by pushing-arms on the rocker-frame, as in the construction above described. The dog is normally in engagement with the spacing-rack. The dog is beveled on its two rack-engaging edges, as shown at $b'$.

In Figs. 8 and 9 the feed of the carriage is accomplished by means of a rack and pinion, preferably by aid of the mainspring. The rack 32 is rigidly attached to the platen-carriage and engages with a pinion 33, rigidly mounted on a shaft with two toothed escapement-wheels $8^b$ $9^b$. These wheels are engaged alternately by a single detaining-dog $14^b$, and when they are released from the dog the carriage is fed forward by the mainspring. The teeth of the wheels are slightly staggered with respect to each other, so that when on depression of the key the dog is thrown from the tooth of the wheel with which it is shown in contact in Fig. 8 in front of a tooth of the other wheel the carriage feeds forward slightly. The beveling of the edges of the escapement or ratchet wheels and of the engaging edges of the dog, as at $c'$ and $c^2$, respectively, permits the dog to freely enter the space between the teeth with but little staggering of the teeth. The beveling of the teeth and the edges of the dog is necessary in this construction to permit the dog to engage with the wheel which it is normally disengaged from without staggering the teeth to such an extent as to endanger blurring in the print. The shaft on which the two wheels are pinned can slide endwise in its bearings. When the detaining-dog has been swung out of engagement with the wheel with which it normally engages and into engagement with the other wheel, the pushing-arm $12^b$ pushes the wheels with the shaft far enough to reestablish their normal engagement. The carriage feeds forward, and upon release of the key the rocker-frame is drawn back by force of a spring 6 and the screw $18^b$ in the arm $17^b$ engages with one of the wheels and carries both of them back with the rocker-frame to normal position. Of course in this as in the other constructions the arm $12^b$ should be longer than the arm $17^b$, so as to bring the screw $13^b$ farther from the axis of the rocker-frame than the screw $18^b$. This form is introduced as one in which the spaced member is not mounted on the paper-carriage; but the rack 32, which engages with the pinion 33, is in a sense a spaced member.

Figs. 10 to 14, inclusive, show a form in which the racks are stationary and can therefore be attached, as is shown, to the frame of the machine. This relieves the paper-carriage of the weight of the rack, thereby making it quicker of motion. In this construction the rack can without detriment be made heavy and rigid, so that there shall be less longitudinal vibration of the carriage as the carriage spaces forward. Since the carriage is relieved of the weight, I prefer to use two racks and place them one above the other with the teeth of each facing those of the other. The dog member enters the racks at the sharp points of the teeth and therefore cannot butt against the sides. It rocks in a vertical instead of a longitudinal plane, whereby vibrations in a longitudinal plane, which alone affect the alinement or spacing or cause blurring of the printing, are greatly diminished, and since it is mounted on the carriage such vibrations as it causes are taken up mainly at the loose connections of the carriage and do not reach the paper-platen.

Further advantages of the construction illustrated in Figs. 10 to 14 will appear from the following description and discussion. In this construction the transversely-movable member, which is the dog member $14^k$ of the escapement, travels with the paper-carriage, the racks being fixed to the frame of the machine. The dog member, which carries two detaining-dogs $14^c$ and $14^{c'}$, is mounted on pivots $15^c$ between shoulders $7^c$ of a frame-bar, from which extend at right angles two arms, through the ends of which passes a polygonal guide-rod $19^c$ for the paper-carriage. This frame-bar projects and abuts against shoulders on the paper-carriage, through which also the guide-rod $19^c$ passes, so that the carriage will move the dog member along with it. As the guide-rod is pinned to the frame in the construction shown, so as to keep the frame-bar in place, the shoulders of the carriage-frame are bored round to permit the carriage-frame to be lifted to examine the work. These holes may be fitted with bushings.

The two dogs $14^c$ and $14^{c'}$ at one end of the dog member engage each with one of the racks. These dogs are movable transversely only. The upper dog $14^{c'}$ is rigidly attached to the dog member. The lower dog $14^c$ is mounted on a pivot $d$ and is limited in its movement by two pins $d'$. The purpose of this movement of the lower dog is to secure the intermeshing of one dog with the rack under all conditions, so that the carriage can never run away. Relatively to their respective dogs the teeth of the upper rack are about one-fifth of a tooth-space ahead of those of the lower rack. The lower dog is normally in mesh with its rack. When the dog member is lifted on commencement of the stroke of the key, the meshing of the dogs is exchanged, and the carriage moves forward one-fifth of a space. When the dog member is lowered, the carriage moves forward the other four-fifths of a space. The raising and lowering of the dog member are accomplished as follows: This member is supported at a point between its ends on screw-points $15^c$, which pass through shoulders $7^c$ on the frame-bar. The inner end of this member—i. e., the end toward the machine—is shown as turned upward and carries a pin 37, which engages with a locking-piece 35. This locking-piece is pivoted at $d^3$ to an arm 34, which at its outer end is pivoted to the dog-frame at a point $d^2$ lying between the dogs and the supporting-pivot of the dog member. The inner end of this arm lies under and is free to slide along a horizontal bar $3^c$, connected by links $4^c$ with the universal bar. (Not shown.) The inner end of this arm 34 is held up by a spring $6^c$, attached to an elbow 38 on the frame-bar. The height to which the inner end of the arm can rise is controlled by an adjustable screw 36, which impinges against a point on the dog member. This screw is so adjusted as to prevent the inner end of the arm from rising high enough to lift the locking-piece off of the pin 37.

The locking-piece has two arms $12^c$ and $17^c$, which engage with a projection 39 on the frame-bar. When a key is depressed and the inner end of the arm 34 is brought down, a cam-surface on the upper end of the locking-piece bears down on the pin 37, above described. The inner end of the dog member is carried down and the dogs lifted from the lower to the upper rack. (See Fig. 12.) The arm $12^c$ is in this position in contact with the projection 39, and as the key is still further depressed the upper end of the locking-piece is thrown back and the dog member is allowed to drop either partially or entirely by its own weight, Fig. 13. As the carriage feeds forward the lower dog slides down into full mesh with its rack. When the key is released, the arm 34 is drawn up by the spring $6^c$ and the arm $17^c$ on the locking-piece contacts with the projection on the frame-bar, pushing its cam over the pin 37, and restores the parts to their original positions. (Shown in Fig. 11.)

In the modification shown in Figs. 15, 16, and 17 the escapement is the same as that of Figs. 1 to 5, except that the locking device is different and differently located, the pushing-point that contacts with the inner or front face of the rack is higher than that which contacts with the outer face instead of being lower, as in Figs. 1 to 5, and the rack is not supported on a friction-joint and is normally in mesh with the detaining-dog instead of the spacing-dog. With this device the rack is not necessarily released from the detaining-dog until the key is released. The rack $14^d$ is normally in mesh with the detaining-dog $9^d$. During the depression of the key the parts pass through the position of Fig. 16 into the position of Fig. 17. In this position the rack may be entirely or only partially released from the detaining-dog. If the rack is thrown entirely from the detaining-dog and onto the reciprocating dog, the mainspring will tend to lift the key just as heretofore shown respecting Figs. 1 to 5 and to return the type into the basket and to reëngage the disengaged members in the escapement. By reason of inacurate adjustment different keys may operate the escapement to different extents, but the carriage cannot fail to be released because the lock $22^d$ holds the rack until the lock is lifted by the pin $24^d$ on the rear or outer pushing-arm $12^d$, which engages with the lock. In order that the rack shall be returned from the position of Fig. 17 to that of Fig. 15 during less than the return of the rocker-frame, the inner or front screw 18$^d$ must impinge upon the rack at a point above the line of its teeth.

Figs. 18, 19, and 20 show a device similar to that of Figs. 15, 16, and 17, except that there is no locking device for the rack 14$^e$, and therefore the screw 13$^e$ must be so adjusted as certainly to push the rack onto the spacing-dog during the downstroke of the key. During the downstroke the parts pass from the position of Fig. 18 through that of 19 to that of 20. The repulser effect is immediately transmitted from the mainspring to the key, the operator lifts his finger, and as the rocker-frame is carried back by the spring 6$^e$ the rack moves off from the spacing and onto the detaining dog; but the carriage is not released until the key is released.

The operation of the parts shown in Figs. 18 to 20 is as follows: The rack 14$^e$ is normally in engagement with the detaining-dog 9$^e$ and disengaged from the spacing-dog 8$^e$. During the depression of a key the spacing-dog is cammed backward or to the right by the camming-arm 11$^e$ and simultaneously the rack is pushed by the screw 13$^e$ off from the detaining-dog onto the spacing-dog. As soon as the rack has been disengaged from the detaining-dog it is pulled forward or to the left by the mainspring until it comes into collision with the face of the spacing-dog. Then if the operator still continues to depress the key he will overcome the pull of the mainspring and retract the carriage, with the dog, to the right until the dog comes against the screw, which limits its vibration in that direction. Upon release of the key the mainspring, acting through the rack and the spacing-dog on the camming-arm 11$^e$, assists the spring 6$^e$ in returning the rocker-frame to its normal position. The spacing-spring 16$^e$ may be arranged to push the dog 8$^e$ to the left against the rocker-frame when out of engagement with the rack, or it may be arranged to space the dog to the right against the stop-screw, as preferred, as was described above in the discussion of the construction of Figs. 1 to 5. If the ordinary spacing-spring which spaces the dog to the right is used, the dog 8$^e$ will be spaced to the limit of its vibration in that direction against the stop-screw when the rack is pushed over onto it; but since the spacing-spring is weaker than the mainspring the dog will then be drawn forward to the left with the rack until the camming-arm 11$^e$ comes into engagement with the support 7$^e$, and then if the key is still further depressed the dog and rack will be retracted again to the right until the key is fully depressed.

Upon the release of the key the action of the parts is as follows: The carriage starts forward under the pull of the mainspring; but the carriage can only be fed forward at a rate of speed proportionate to the speed at which the rocker-frame is returned to its normal position, for the longitudinal arm 11$^e$ on the inner end of the spacing-dog shaft, pressing on the support 7$^e$ in the same manner as was described in the discussion of Figs. 1 to 6, prevents the spacing-dog 8$^e$ from being moved forward until the rocker-frame is swung outward. When the carriage has been advanced through a part of the distance through which it is fed, the screw 18$^e$ upon vertical arm 17$^e$ on the rocker-frame engages the rack 14$^e$ and swings it over onto the detaining-dog 9$^e$. Hence the carriage is fed forward the first part of the distance while it is engaged with the spacing-dog and the last part after it has been reëngaged with the detaining-dog. The beveled edges of the rack-teeth and of the detaining-dog permit of the entrance of that dog into the rack before the carriage has been fed through the entire distance between two rack-teeth.

It is obvious from the foregoing description that the essential features of the forms of escapement described are as follows: There should be two members, (shown as a rack member and a dog member,) which can be made to engage and disengage, so as to effect the operation of spacing. The phrases "engage" and "disengage" are used in a very general sense and are intended to include the case where one of the members has two elements—as, for example, two dogs—one of which, and one only, can be moved in the line of the feeding through the distance of one step, (as in all of the devices except those of Figs. 8 to 14,) and the other member alternately engages with these two elements. The term "engagement" as used in the claims designates the normal engagement when the machine is at rest, and the term "disengagement" designates the relation of the members of the escapement opposite thereto. To illustrate: The members are shown in engagement in Figs. 3, 11, and 18 and in disengagement in Figs. 4, 12, and 20. One of the members should travel with the paper-carriage, though not necessarily attached to it, as appears from Figs. 8 and 9, and in effecting the operation of spacing should move transversely with respect to the other member. In order to accomplish the release of the carriage at the desired moment, i. e., just about the moment of printing, either both members should be movable transversely and be normally in the reversed engagement indicated in Figs. 15 and 18, and should be disengaged at the proper moment, or the parts enumerated above should be constructed and combined as follows: One of the members should be jointed or flexible or mounted on pivots or on a slide and be adapted to be spaced with respect to and under control of the other member. The dog member is shown as consisting of a detaining-dog or of a combined detaining and spacing dog and the rack member is shown as consisting of a single or double rack, pivoted or fixed, or a pair of sliding toothed wheels.

There should be means (shown as the key and mechanism operatively connected therewith) for effecting the disengagement of the members, to effect which some means must be provided for controlling the joint while the members are being disengaged, whether by operating the joint or holding it inoperative. If the latter, it may be accomplished by mere friction at the joint or by the pressure of friction-springs or by a lock. In the form shown in Fig. 8 the toothed or rack wheels 8$^b$ 9$^b$ are prevented from sliding too freely by the friction at the bearings of the axis, but mainly by the friction at the rack and pinion 32 32. In the forms shown in Figs. 10 to 14 the joint here referred to as controlled is that between the dog member and the pivoted arm which carries on its free end the locking-piece. There should also be means to effect the reëngagement of its members, shown in the swinging-rack form as one of the pushing-screws on the rocker-frame for swinging the rack on its joint and in Figs 10 to 14 as the force of gravity timed by the coöperation of the locking-piece and the pin of the dog member. There should also be means for effecting the spacing by the aid of these movements, and, finally, since these movements leave the parts displaced, the rack or wheels and rocker-frame being moved in toward the machine, or, Figs. 10 to 14, the locking piece and pin being in inoperative relation, there must be some means for reëstablishing the normal position of the parts.

It will be observed that in each of the escapements which I have shown a coöperating action or buckling of two parts in the escapement takes place during the movement of the members necessary to control the spacing of the paper-carriage. This is a distinguishing characteristic of my invention, and from its similarity to the opening and closing of a buckle I designate it as the "buckling" of the parts in the escapement. Through the instrumentality of this buckling I am enabled to let off the carriage at or before the instant of printing and to reëngage the members which are normally in engagement, as, say, the rack and the spacing-dog in Figs. 1 to 5 or the rack and detaining-dog in Figs. 18 to 20, either following the let off or after the stroke while the key is returning to normal position, as preferred. Thus, for example, in all of the escapements shown the let off takes place before or substantially at the instant of printing, but in the forms shown in Figs. 1 to 14, inclusive, the reëngagement takes place following the let off, and in those shown in Figs. 15 to 20 it takes place while the key is returning to normal position.

The two parts which form the buckle-joint in the escapement must be carefully distinguished from the two engaging members. My escapement has, broadly, four elements—viz., two engaging members and two parts which form the buckle-joint that is operative to effect the engagement and disengagement of the members. The parts which constitute the engaging members may be identical with those that form the buckle-joint, as, for example, in Figs. 1 to 6, or they may be different, as in Figs. 10 to 14, where the buckle-joint is wholly in one of the members; and the buckle-joint may be composed of two parts hinged together on an axis, as in Figs. 10 to 14, or they may be parts that are not actually hinged together, but which engage with one another and move like the parts of a buckle during the act of engaging and disengaging, as in Figs. 1 to 6. In this latter case the buckle-joint may be partially or entirely broken during some stage of the movements of the parts. Where in the claims I specify means for returning the parts to normal position I mean returning the parts which form the buckle-joint to their normal relative positions after they have been buckled to let off the carriage.

For the purposes of my invention it is convenient to divide type-writers into two general classes—viz., into high-grade machines, or those which are provided with power-driven paper carriages, and into low-grade machines, or those which are not provided with power-driven paper-carriages. In the former class some motive power, generally a coiled mainspring, constantly tends to draw the carriage from the starting-point at the right-hand end of the line toward the left-hand end. This force is held in check by the escapement, and the carriage is advanced under the pull of the mainspring step by step as the escapement is operated from the keys. In the class of low-grade machines the paper-carriage is driven forward by the force of the blow on the key acting through the escapement, and a correspondingly harder blow is required.

My invention, although primarily designed for high-grade machines provided with power-driven paper-carriages, is equally applicable with low-grade machines.

Since in all those forms in which a spacing-dog is used a spring is shown pushing it in the direction of the feeding of the carriage, no other force is necessary to feed the carriage. The mainspring may therefore be omitted, and since the carriage will then not move forward when released from the spacing-dog no detaining-dog is necessary.

The beveling of the sides of the rack-teeth and dogs may also be of material assistance in advancing the carriage. Thus, for example, with the escapement illustrated in Figs. 1 to 6, inclusive, the mainspring may be dispensed with, and the carriage may then be fed forward as follows, viz: When a type-key is struck and commences to be depressed, the dog 8 is first disengaged from the rack and the dog 9 is brought into engagement therewith. As the dog 9 comes into engagement with the rack its beveled edge (shown in Fig. 6) contacts with the beveled edge of the rack-tooth, thus starting the carriage forward before the impact of the type on the paper. Then as the key is carried farther down the dog 8 is cammed back and then reëngaged with the rack, its beveled edge sliding in across the beveled edge of the rack-tooth, and when the key has been fully depressed and the dog 9 disengaged from the rack the carriage will be spaced forward on the release of the key the remainder of the distance to complete the letter-space by the force of the spring which acts on the dog 8 and on the rocker-frame. The dog 8 cannot be spaced either backward or forward too far in the line of the carriage-feed, because its vibrations in both directions are limited by the adjusting-screws on the rocker-frame. Hence there can be no overfeed of the carriage.

Viewed from the manufacturing standpoint, there is no imperative need for beveling both the sides of the rack-teeth and the edges of the dogs. For example, in cheap machines I may dispense with the mainspring and step the carriage forward by the impact of the dogs on the beveled sides of the rack-teeth, as above described or as described in my Patent No. 554,874, dated February 18, 1896. In this case I might leave the rack-teeth plain and not incur the extra expense of beveling them; but they would soon become beveled from use by the rubbing of the dogs across them. In the claims where I say that both the rack-teeth and the dogs are "beveled" I mean to include any construction which is thus manufactured or which will wear into this form by use.

The escapements herein shown have one advantage that is independent of the moment at which the carriage is let off—viz., a polishing action at the contact-surfaces of the escapement, which results from the fact that the two surfaces do not slide past each other transversely in both directions along the same path. In Figs. 1 to 6 the spacing-dog leaves the face of the rack and the detaining-dog enters the rack on arcs of a circle having a radius substantially equal to the length of the rocker-frame, while the rack leaves the detaining-dog and reëngages with the spacing-dog in a path determined by the combined movement of both the members, and there is still another movement at the contacting surfaces when the rack and rocker-frame return together to normal position. Substantially the same movements are found in the devices of Figs. 7, 8, 9, and 15 to 20. In this action the surfaces constantly polish each other on new lines, thus rubbing out lines previously made. Thus the friction in the escapement is reduced, the touch made easier, and the life of the working faces prolonged. This polishing action results from and is one of the advantages of the buckling of the parts in the escapement above described.

Another advantage of the swinging rack resulting in greatly-improved alinement is that the impacts of the dogs against the teeth of the rack do not jar the paper-platen, the force of the blows being taken up by more or less movement of the rack on its pivots.

It is also an advantageous feature of each of the constructions herein shown that when the carriage is released from the escapement for the purpose of setting it at any desired point it does not on reëngagement space forward an additional letter-space.

I have shown and described in this specification several distinct but coöperating improvements in type-writer escapements. While these improvements are all mutually beneficial, they are not dependent on one another, and either one may be employed without the others. Thus, for example, the beveled-edge rack-teeth and dogs may be advantageously employed in many of the escapements now in use, and the camming-arm on the spacing-dog pivot-shaft, by aid of which the key and printing member are simultaneously returned to normal position on release of the type-key and the carriage is spaced, all by the pull of the mainspring, are applicable with the escapements described in my said Patent No. 554,874, or in my application, Serial No. 603,845, filed August 25, 1896.

I do not in this application claim, broadly, a spacing mechanism comprising two engaging members which can be disengaged, and one of which can be spaced with respect to the other, a joint in one of the members, means for effecting the disengagement of the members, including means for controlling the joint while the disengagement is being effected, means for operating the joint to effect the reëngagement of the members, means for effecting the spacing by aid of these movements, and means for reëstablishing the normal position of the parts. This I have already broadly claimed in my said Patent No. 554,874. Neither do I herein broadly claim a cam to operate the spacing-dog when disengaged from the rack, as that is also claimed in my said Patent No. 554,874.

I do not in this application claim, broadly, in a type-writer escapement the combination of a dog-carrying rocker-frame and a reciprocating dog mounted thereon, a spring on the rocker-frame which spaces the dog normally forward to a stop and holds it there, and means for spacing the dog backward, as that is claimed in my Patent No. 554,874, above mentioned, but I claim specifically in combination with a stop to limit the backward spacing of the dog.

I do not in this application claim the combination of spacing mechanism, a carriage advanced thereby, a line-lock comprising two stops, means for advancing one of the line-lock stops with the carriage into position to obstruct the said other line-lock stop while both the stops are in their normal positions, nor do I claim the combination, with a movable stop advanced by the carriage to obstruct the spacing mechanism at a predetermined point, of an independent key and means operated thereby to positively remove the obstruction from the spacing mechanism nor any combination specific thereto or based upon the line-lock-stop mechanism hereinbefore described and shown in the accompanying drawings, as I reserve such matter for and claim such matter in another application filed November 10, 1896, and serially numbered 611,607, which last-named application is a division hereof.

I do not limit myself to the details shown, and particularly I do not limit myself to combining my jointed escapement member with any particular form of let-off mechanism.

What I claim, and desire to secure by Letters Patent, is—

1. In a type-writer escapement the combination of two engaging members which can be disengaged and reëngaged one of which can be spaced step by step with respect to and under control of the other, means for moving the two members together transversely, means for returning them transversely, means for disengaging and reëngaging them by aid of these movements, and means for thereby effecting the spacing, substantially as described.

2. In a type-writer escapement the combination of two engaging members which can be disengaged and reëngaged and one of which can be spaced step by step with respect to and under control of the other, means for operating the two members transversely, means for holding one of the members inoperative and operating the other to effect the separation of the members, means for operating the first-named member to effect their reëngagement and means for effecting the spacing by aid of these movements, substantially as described.

3. In a type-writer escapement the combination of two engaging members which can be disengaged and reëngaged and one of which can be spaced step by step with respect to and under control of the other, means for operating the two members together transversely, a joint in one of the members, means for holding the joint inoperative and operating the other member to effect the separation of the members, means for operating the joint to effect their reëngagement, and means for effecting the spacing by aid of these movements, substantially as described.

4. In a type-writer escapement the combination of two engaging members which can be disengaged and reëngaged, one of which can be spaced step by step with respect to and under control of the other, means for moving the two members transversely, means for reversing their relative transverse movement, thereby effecting their disengagement, means for reëstablishing their normal engagement, and means for effecting the spacing by aid of these movements, substantially as described.

5. In a type-writer escapement the combination of two engaging members which can be disengaged and reëngaged, one of which can be spaced step by step with respect to and under control of the other, means for moving the two members together transversely, means for returning them transversely, a lock for holding one of the members during part of the return movement of the other thereby effecting the disengagement, means for reëstablishing their normal engagement, and means for effecting the spacing by aid of these movements, substantially as described.

6. In a type-writer escapement the combination of two engaging members which can be disengaged and reëngaged and one of which can be spaced step by step with respect to and under control of the other, a joint in the member that can be so spaced, means for operating the two members together transversely, means for holding the joint inoperative and operating the other member to effect the separation of the members, means for operating the joint to effect their reëngagement, and means for effecting the spacing by aid of these movements, substantially as described.

7. In a type-writer escapement the combination of two engaging members, which can be disengaged and reëngaged and one of which can be spaced step by step with respect to and under control of the other, a joint in the member that can be so spaced, means for moving the two members together transversely, means for returning them transversely, a lock for holding the joint inoperative during part of the return movement of the other member thereby effecting their disengagement, means for operating the joint to effect the reëngagement of the members, and means for effecting the spacing by aid of these movements, substantially as described.

8. In a type-writer escapement the combination of spacing mechanism comprising two engaging members movable transversely with respect to each other whereby they are disengaged and reëngaged, one of which is jointed and can be spaced step by step with respect to and under control of the other, means for effecting the transverse movement of the said other member, means for controlling the joint while this transverse movement is being effected, means for operating the joint to effect the reëngagement of the members, means for effecting the spacing by aid of these movements, and means for reëstablishing the normal position of the parts, substantially as described.

9. In a type-writer escapement the combination of spacing mechanism comprising two engaging members movable transversely with respect to each other whereby they are disengaged and reëngaged, one of which is jointed and can be spaced step by step with respect to the other, means for effecting the transverse movement of the said other member, means for holding the joint inoperative while the transverse movement is being effected, to effect the disengagement of the members, means for operating the joint to effect the reëngagement of the members, means for effecting the spacing by aid of these movements, and means for reëstablishing the normal position of the parts, substantially as described.

10. In a type-writer escapement the combination of spacing mechanism comprising a rack member and a dog member movable transversely with respect to each other, whereby they are disengaged and reëngaged, a joint in the rack member, means for effecting the transverse movement of the dog member, means for holding the joint inoperative while the transverse movement is being effected, to effect the disengagement of the members, means for operating the joint to effect the reëngagement of the members, means for effecting the spacing by aid of these movements, and means for reëstablishing the normal position of the parts, substantially as described.

11. In a type-writer escapement the combination of spacing mechanism comprising a rack and a dog movable transversely with respect to each other, whereby they are disengaged and reëngaged, the rack being mounted on pivots to swing on a longitudinal axis, means for effecting the transverse movement of the dog, means for holding the rack stationary while this transverse movement is being effected, to effect the disengagement of the rack from the dog, means for swinging the rack on its axis into reëngagement with the dog, means for effecting the spacing by aid of these movements, and means for reëstablishing the normal position of the parts, substantially as described.

12. In a type-writer escapement the combination of spacing mechanism comprising two engaging members which can be disengaged and reëngaged, one of which is jointed and one of which can be spaced step by step with respect to and under control of the other, means for effecting the disengagement of the members, a lock for holding the joint inoperative while the disengagement is being effected, means for operating the joint to effect the reëngagement of the members, and means for effecting the spacing by aid of these movements, substantially as described.

13. In a type-writer escapement the combination of spacing mechanism comprising two engaging members which can be disengaged and reëngaged, one of which is jointed and one of which can be spaced step by step with respect to and under control of the other, means for effecting the disengagement of the members, a pivoted lock and means for moving the lock into obstructive position to hold the joint inoperative while the disengagement is being effected, means for operating the joint to effect the reëngagement of the members, and means for effecting the spacing by aid of these movements, substantially as described.

14. In a type-writer escapement the combination of spacing mechanism comprising two engaging members movable transversely with respect to each other whereby they are disengaged and reëngaged, one of which is jointed and can be spaced step by step with respect to the other, means for effecting the disengagement of the members, a lock for holding the joint inoperative while the disengagement is being effected, means for operating the joint to effect the reëngagement of the members, means for effecting the spacing by aid of these movements, and means for reëstablishing the normal position of the parts, substantially as described.

15. In a type-writer escapement the combination of spacing mechanism comprising a rack member and a dog member movable transversely with respect to each other, whereby they are disengaged and reëngaged, a joint in the rack member, means for effecting the transverse movement of the dog member, means for effecting the transverse movement of the rack member, a lock for holding the joint inoperative while the disengagement is being effected, means for operating the joint to effect the reëngagement of the members, and means for effecting the spacing by aid of these movements, substantially as described.

16. In a type-writer escapement the combination of spacing mechanism comprising two engaging members which can be disengaged and reëngaged, one of which is jointed and one of which can be spaced step by step with respect to the other, means for effecting the disengagement of the members, a lock for holding the joint inoperative while the disengagement is being effected, means for operating the joint to effect the reëngagement of the members, means for effecting the spacing by aid of these movements, and means for reëstablishing the normal position of the parts, substantially as described.

17. In a type-writer escapement the combination of spacing mechanism comprising two engaging members movable transversely with respect to each other whereby they are disengaged and reëngaged, one of which is jointed and can be spaced step by step with respect to the other, means for effecting the disengagement of the members, a lock for holding the joint inoperative while the disengagement is being effected, means for operating the joint to effect the reëngagement of the members, means for effecting the spacing by aid of these movements, and for reëstablishing the normal position of the parts, substantially as described.

18. In a type-writer escapement the combination of spacing mechanism comprising a rack member and a dog member movable transversely with respect to each other, whereby they are disengaged and reëngaged, a joint in the rack member, means for effecting the transverse movement of the dog member, a lock for holding the joint inoperative while the disengagement is being effected, means for operating the joint to effect the reëngagement of the members, means for effecting the spacing by aid of these movements, and means for reëstablishing the normal position of the parts, substantially as described.

19. In a type-writer escapement the combination of spacing mechanism comprising a rack and a dog movable transversely with respect to each other, whereby they are disengaged and reëngaged, the rack being mounted on pivots to swing on a longitudinal axis, means for effecting the transverse movement of the dog, means for effecting the transverse movement of the rack, a lock for holding the rack stationary at the limit of its transverse movement while the disengagement is being effected, means for swinging the rack on its axis into reëngagement with the dog, and means for effecting the spacing by and of these movements, substantially as described.

20. In a type-writer escapement the combination of a rack member having teeth with beveled edges, and a dog member engaging therewith and beveled in parallelism with the sides of the teeth of the rack, substantially as described.

21. In a type-writer escapement the combination of a rack having teeth beveled to form a thin edge on both sides, with a dog having two parts engaging with the rack on opposite sides, and beveled in parallelism with the teeth of the rack, substantially as described.

22. In a type-writer escapement, the combination of two engaging members one of which can be spaced step by step with respect to and under control of the other, a reciprocating element in one of the members which alternately engages and disengages with the other member, and beveled edges on the engaging sides of the members whereby the reciprocating element freely engages with the other member and is spaced by the beveled faces in a direction opposite to that in which the spaced member is fed, substantially as described.

23. In a type-writer escapement, the combination of a dog member and a rack member both movable transversely to effect the spacing, a type-key, and means operated thereby to effect the engagement and disengagement between the two members, substantially as described.

24. In a type-writer escapement, the combination of a pivoted dog member and a pivoted rack member both movable transversely to effect the spacing, a type-key, and means operated thereby to effect the engagement and disengagement between the two members, substantially as described.

25. In a type-writer escapement, the combination of two engaging members one of which can be spaced forward step by step and the other of which comprises two elements one of which elements normally engages with the spaced member and one of which elements is normally disengaged, and means operated by the keys for spacing the normally-disengaged element backward while it is being brought into engagement with the spaced member, substantially as described.

26. In a type-writer escapement, a rack member having two series of working faces, one series having its working faces in planes which cut the planes of the working faces of the other series at an angle, substantially as described.

27. In a type-writer escapement, the combination of a rack which can be spaced forward step by step with respect to and under control of a dog, and a dog which engages therewith and is provided with a rack-engaging face oblique to the direction in which the rack is spaced forward, means for disengaging the dog from the rack, means for spacing the dog backward while disengaged from the rack, means for reëngaging the dog with the rack, a cam for spacing the rack backward by the impact of the dog, and means for spacing the dog and rack forward together, substantially as described.

28. In a type-writer, the combination of a key, a printing member, a connection between the two whereby the printing member is operated by the stroke of the key to effect the printing, an escapement connected with the key, means for operating the escapement by the key, a paper-carriage that is spaced under control of the escapement, means for releasing the carriage during the stroke on the key, means for advancing the carriage when released, and a connection between the carriage-advancing means and the printing member, through the feeding mechanism, whereby the printing member is started toward normal position by aid of the carriage-advancing means when the key is released, substantially as described.

29. In a type-writer, the combination of a key, a type-bar, a connection between the two whereby the type-bar is operated by the depression of the key to effect the printing, an escapement connected with the key, means for operating the escapement by the key, a paper-carriage that is spaced under control of the escapement, means for releasing the carriage during the stroke on the key, a mainspring for advancing the carriage when released, and a connection between the carriage-mainspring and the type-bar through the feeding mechanism, whereby the type-bar and the escapement are started toward normal position by aid of the carriage-mainspring when the key is released, substantially as described.

30. In a type-writer escapement, the combination of two engaging members which can be disengaged and reëngaged, means operated by the keys for disengaging the members, and means operated by the carriage-propelling power for reëngaging the members, substantially as described.

31. In a type-writer escapement, the combination of a rack member and a dog member which engage together and can be disengaged and reëngaged, means operated by the keys for disengaging the dog member from the rack member, and means operated by the carriage-mainspring for reëngaging the two members, substantially as described.

32. In a type-writer, the combination of a printing member, and an escapement which comprises two engaging members that can be disengaged and reëngaged, means operated by the type-keys for moving the printing member to print and for disengaging the members in the escapement, and means operated by the carriage-propelling power for starting the printing member back to its normal position and for reëngaging the escapement members, substantially as described.

33. In a type-writer, the combination of a type-bar, and an escapement which comprises a rack member and a dog member which engage together and can be disengaged and reëngaged, means operated by a type-key for moving the type-bar to print and for disengaging the dog member from the rack member, and means operated by the carriage-mainspring for starting the type-bar back to its normal position and for reëngaging the dog member with the rack member, substantially as described.

34. In a type-writer escapement, the combination of two engaging members, one of which comprises two elements which alternately engage and disengage with the other member, means for normally engaging one of the elements with the other member, means operated by the keys for disengaging this element from the other member and for engaging the said other element therewith, and means operated by the propelling power for returning the normally engaging element into reëngagement with the other member, substantially as described.

35. In a type-writer escapement, the combination of a rack member, and a dog member which engages therewith and comprises two dogs which alternately engage and disengage with the rack member, means for normally engaging one of the dogs with the rack, means operated by the keys for disengaging this dog from the rack and for engaging the other dog therewith, and means operated by the carriage-mainspring for reëngaging the normally engaging dog with the rack, substantially as described.

36. In a type-writer escapement, the combination of a rack member, and a dog member which engages therewith and comprises a detaining-dog which normally engages with the rack and a spacing-dog which is normally disengaged, means operated by the keys for disengaging the detaining-dog from the rack and for engaging the spacing-dog therewith, and means operated by the carriage-mainspring for disengaging the spacing-dog from the rack and for reëngaging the detaining-dog therewith, substantially as described.

37. In a type-writer escapement, the combination of two engaging members which can be disengaged and reëngaged, means operated by the keys for disengaging the members, and means operated by the escapement-retracting spring and the carriage-propelling power for reëngaging the members, substantially as described.

38. In a type-writer escapement, the combination of a rack member and a dog member which engage together and can be disengaged and reëngaged, means operated by the keys for disengaging the dog member from the rack member, and means operated by the escapement-retracting spring and the carriage-mainspring for reëngaging the two members, substantially as described.

39. In a type-writing machine, the combination of carriage-propelling power, and an escapement comprising two engaging members one of which can be spaced forward step by step and the other of which comprises two elements one of which elements normally engages with the spaced member and one of which elements is normally disengaged, means for spacing the normally-disengaged element backward while out of engagement with the spaced member, means for engaging the normally-disengaged element with the spaced member, means for spacing the normally-disengaged element forward while in engagement with the spaced member and for disengaging it from the spaced member by the propelling power, substantially as described.

40. In a type-writing machine, the combination of carriage-propelling power, and an escapement comprising a dog member and a rack member, a spacing-dog which is normally disengaged from the rack, means for spacing the said dog backward while out of engagement with the rack, means for engaging the dog with the rack, means for advancing the dog with the rack and for camming it out of the rack by the carriage-mainspring, substantially as described.

41. In a type-writer, the combination of a key, carriage-propelling power, an escapement, and means for bringing the propelling power into action with the escapement to lift the key when the key is depressed, substantially as described.

42. In a type-writer, the combination of a power-driven paper-carriage, and an escapement to control the feed thereof comprising two engaging members that can be disengaged and reëngaged and one of which can be spaced step by step with respect to and under control of the other, a reciprocating element in one of the members, and means operated by the carriage-propelling power for moving the reciprocating element in a direction oblique to that in which the spaced member of the escapement is advanced, substantially as described.

Signed by me, in the city of New York, this 7th day of January, 1893.

FREDERIC W. HILLARD.

In presence of—
  THOMAS EWING, Jr.,
  NEAL EWING.